United States Patent
Johnson

(10) Patent No.: US 6,450,507 B2
(45) Date of Patent: Sep. 17, 2002

(54) WATER INGRESS SEAL FOR TAPERED SEALS

(75) Inventor: Ready Joseph Johnson, Houston, TX (US)

(73) Assignee: ABB Vetco Gray Inc., Houston, TX (US)

( * ) Notice: Subject to any disclaimer, the term of this patent is extended or adjusted under 35 U.S.C. 154(b) by 50 days.

(21) Appl. No.: 09/775,118

(22) Filed: Feb. 1, 2001

Related U.S. Application Data

(60) Provisional application No. 60/183,183, filed on Feb. 17, 2000.

(51) Int. Cl.[7] ................................................. F16L 17/06
(52) U.S. Cl. ........................ 277/612; 277/615; 277/616; 285/334.2
(58) Field of Search .................................. 277/608, 609, 277/612, 615, 616; 285/334.1, 334.2

(56) References Cited

U.S. PATENT DOCUMENTS

| | | | | |
|---|---|---|---|---|
| 3,339,948 A | * | 9/1967 | Weitzel | |
| 3,351,352 A | | 11/1967 | Blakeley et al. | |
| 4,361,331 A | * | 11/1982 | Kohler | |
| 4,474,381 A | | 10/1984 | Wilkins et al. | |
| 4,747,606 A | * | 5/1988 | Jennings | |
| 5,103,915 A | * | 4/1992 | Sweeney et al. | |
| 5,466,018 A | | 11/1995 | Stobbart | |
| 5,839,765 A | | 11/1998 | Carter et al. | |

* cited by examiner

Primary Examiner—Robert J. Sandy
Assistant Examiner—Karlena Schwing
(74) Attorney, Agent, or Firm—Bracewell & Patterson, L.L.P.

(57) ABSTRACT

A wellhead housing includes a metal seal with a ring portion and a rib portion. The ring portion includes two frustoconical surfaces for mating with tapered surfaces of a wellhead connector and the wellhead housing. Two conical, metal-to-metal seals are created where the ring portions of the seal engage the tapered surfaces of the wellhead connector and housing. These metal-to-metal seals contain internal pressure within the wellhead. Two legs extend outward from the rib portion. An upward-facing foot surface at the end of the top leg engages the wellhead connector, while a downward-facing foot surface at the end of the bottom leg engages the wellhead housing. A metal-to-metal seal created between each foot surface and the corresponding tubular member resists external pressure to prevent water ingress into the joint.

8 Claims, 1 Drawing Sheet

WATER INGRESS SEAL FOR TAPERED SEALS

This application claims the benefits of Provisional Patent Application Serial No. 60/183,183, filed Dec. 17, 2000.

TECHNICAL FIELD

This invention relates to a seal for a subsea well system. More particularly, this invention relates to a tapered wellhead seal having provisions to prevent water ingress into the well.

BACKGROUND OF THE INVENTION

In subsea oil and gas well systems, a wellhead connector is installed onto the wellhead housing at the sea floor. For sealing between the wellhead connector and the wellhead housing, an annular gasket or seal is positioned between the connector and the housing. U.S. Pat. No. 4,474,381 dated Oct. 2, 1984 discloses a tubular joint with a metal seal ring positioned between internal tapered surfaces on the tubular members. This type of seal is for sealing against internal pressure within the tubular members.

Advances in offshore drilling technology have made it possible to drill in deeper water than ever before. As drilling depths increase, so does the water pressure at the sea floor. New seals had to be designed to withstand the increased external pressure when the internal pressure is lower than the external pressure. U.S. Pat. No. 5,839,765 dated Nov. 24, 1998 discloses a metal seal ring which creates a metal-to-metal seal against internal pressure within the tubular members. A pair of O-ring seals mounted to the seal rib creates a secondary seal to prevent the ingress of sea water into the joint. O-ring seals have also been used on the outer sides of the primary seal surfaces to prevent ingress of sea water.

Although the secondary O-ring seal represents an improvement over the prior art, further improvements are desired. O-ring seals are prone to deteriorate in the environment of a subsea wellhead. Replacing a seal on a gasket of a connector would be difficult and expensive. It is desirable to provide a seal which can seal against internal and external pressures without requiring the use of elastomers.

SUMMARY OF THE INVENTION

The present invention relates to an improved seal for a subsea wellhead connector. The seal of the invention includes a metal seal with a ring portion and a rib portion. The rib portion extends radially outward from the ring portion. The ring portion includes two frustoconical surfaces for mating with tapered surfaces of the wellhead connector and wellhead housing. Two conical, metal-to-metal seals are created where the ring portions of the seal engage the tapered surfaces of the wellhead connector and housing. These metal-to-metal seals are the primary seals to contain internal pressure within the wellhead.

In a preferred embodiment, two legs extend outward from the rib portion. An upward-facing foot surface at the end of the upper leg engages the wellhead connector, while a downward-facing foot surface at the end of the lower leg engages the wellhead housing. A metal-to-metal seal is created between each foot surface and the corresponding tubular member. These seals resist external pressure to prevent water ingress into the joint.

DETAILED DESCRIPTION OF THE INVENTION

Figure 1:
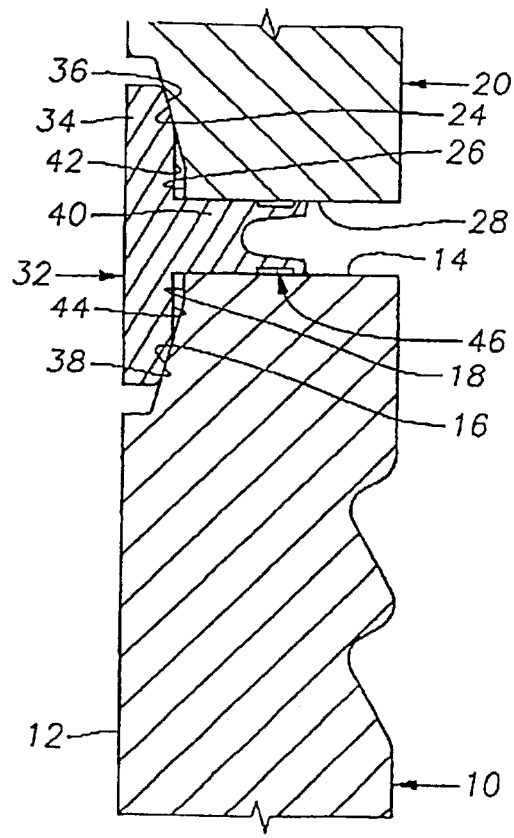
FIG. 1 is a sectional detail of a seal constructed in accordance with this invention, shown installed.

Referring first to FIG. 1, a generally cylindrical subsea wellhead housing 10 has a bore 12 and extends upward from the sea floor. Housing 10 has an upward facing shoulder 14 generally perpendicular to bore 12 and a conical primary seal surface 16 on its inner diameter, extending from shoulder 14 downward and inward into bore 12. Between conical primary seal surface 16 and shoulder 14 is a cylindrical transition surface 18. Cylindrical transition surface 18 is concentric with bore 12 at a larger diameter, and intersects orthogonally with shoulder 14.

A wellhead connector 20 is adapted to connect to wellhead housing 10, and has a downward facing shoulder 28. A conical primary seal surface 24 and cylindrical transitional surface 26 on the inner diameter of connector 20 substantially mirrors seal surface 16 and transitional surface 18.

A metal tapered seal 32 is adapted to seal against primary seal surfaces 16, 24 and position between upwardly facing shoulder 14 and downwardly facing shoulder 28. Seal 32 has a ring portion 34 with an upper tapered surface 36 and lower tapered surface 38 on its outer diameter. Upper and lower tapered surfaces 36, 38 each have approximately the same slope as upper seal surface 16 and lower seal surface 24 respectively. The diameter of seal ring 32 is such that tapered surfaces 36, 38 interferingly engage conical surfaces 16, 24. The interference causes elastic deformation of tapered seal 32 when connector 20 is landed on wellhead housing 10 and seals tapered seal 32 to connector 20 and housing 10. Seal 32 contains pressure within wellhead housing 10 and connector 20.

Seal ring 32 has a rib portion 40 which extends radially outward from ring portion 34. Upper and lower transition surfaces 42, 44 reside on ring portion 34 to either side of rib 40 and are generally parallel with transitional surfaces 18, 26 of connector 20 and housing 10. Rib portion 40 is sized to fit in between upwardly facing shoulder 14 and downwardly facing shoulder 28.

In a preferred embodiment, rib portion 40 has an ingress seal 46 on its outer diameter. Ingress seal 46 comprises two legs 48 which are either formed from or attached to rib portion 40. Legs 48 are biased apart, one upward and one downward, and form generally a V-shape in relation to one another. The crotch 50 of the V-shape is curved rather than sharp to eliminate stress raisers. Each leg 48 has a recess on its outer surface, forming a foot 52 at the leg's end.

Figure 2:
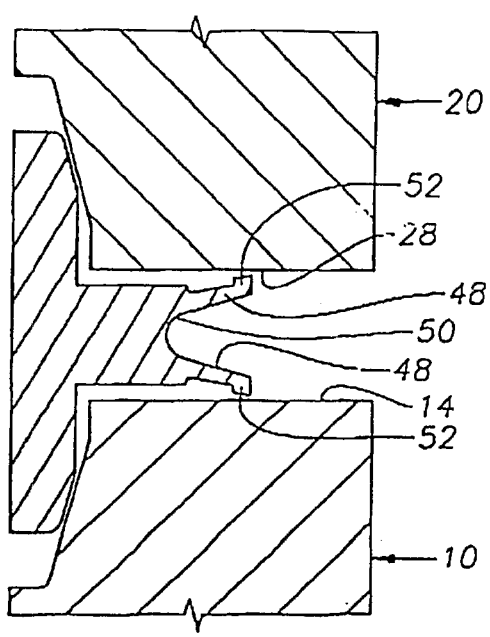
FIG. 2 is a sectional detail of the seal of FIG. 1, shown prior to installation.

Unrestrained, feet 52 reside above and below rib 40 (FIG. 2); however, when connector 20 is landed on housing 10 it bends legs 48 to be almost parallel, and feet 52 press tightly against wellhead shoulder 14 and connector shoulder 28 (FIG. 1) and form a seal preventing water from leaking into bore 12. Rib 40 serves as a positive stop to limit the downward movement of connector 20. As water fills in between downward facing connector shoulder 28 and upward facing wellhead shoulder 14, the hydrostatic pressure of the water applies a force between legs 48, causing feet 52 to press more tightly against surfaces 14 and 28 and further energize ingress seal 46. If connector 20 and wellhead housing 10 separate slightly due to bending forces on the riser, feet 52 still press against downwardly facing shoulder 28 and upward facing surface 14 to maintain the seal.

The seal of the invention has several advantages. The metal-to-metal ingress seals effectively prevent seawater from entering the joint when the external pressure exceeds the internal pressure. Unlike elastomer seals, the metal-to-metal ingress seals do not deteriorate when used in the environment of a subsea wellhead. The durability of the seal of the invention reduces the likelihood that a seal will require replacement.

Though the invention is discussed in the context of a subsea wellhead and a wellhead connector, it would be clear to one skilled in the art that this invention is applicable to virtually any connection employing a tapered seal, for example the juncture of two hubs. Additionally, while the invention has been shown in only one of its forms, it should be apparent to those skilled in the art that it is not so limited, but is susceptible to various changes without departing from the scope of the invention.

I claim:

1. A tubular joint comprising:
   a first tubular member having a bore, a tapered inner end surface, and a shoulder surface which is generally perpendicular to the bore;
   a second tubular member having a bore, a tapered inner end surface, and a shoulder surface which is generally perpendicular to the bore, said second tubular member connected with first tubular member in an end-to-end orientation;
   a metal annular seal having a first tapered sealing surface that sealingly engages the tapered inner end surface of the first tubular member, a second tapered sealing surface that sealingly engages the tapered inner end surface of the second tubular member; and
   the annular seal having metal first and second ingress seal surfaces located between the shoulder surface of the first and second tubular members, the first and second ingress seal surfaces being biased in opposite directions to sealingly engage the shoulder surface of each tubular member.

2. The tubular joint of claim 1, wherein the annular seal comprises a ring portion containing the first and second tapered sealing surfaces and a rib portion, the rib portion extending radially outward from the ring portion relative to an axis of the tubular members, each of the first and second ingress sealing surfaces extending radially outward from the rib portion.

3. The tubular joint of claim 1 wherein the ingress seal surfaces comprise two legs which extend generally radially outward from the first and second tapered sealing surfaces relative to an axis of the tubular member.

4. The tubular joint of claim 1 wherein the annular seal comprises a ring portion containing the first and second tapered sealing surfaces and a rib portion, the rib portion extending radially outward from the ring portion relative to an axis of the tubular members, the first and second ingress sealing surfaces comprising a pair of legs joined to and extending radially outward from the rib portion relative to an axis of the tubular members.

5. The tubular joint of claim 1 wherein the annular seal comprises a ring portion containing the first and second tapered sealing surfaces, a rib portion extending radially outward from the ring portion relative to an axis of the tubular members, and a pair of legs joined to and extending radially outward from the rib portion relative to an axis of the tubular members, the first and second ingress sealing surfaces comprising foot portions located on each leg that sealingly engage one of the shoulder surfaces of each of the tubular members.

6. The tubular joint of claim 5 wherein the two legs diverge apart from each other in a radially outward direction before the annular seal is installed, and wherein installation of the seal causes the two legs to deflect, so that the feet move toward each other.

7. A subsea wellhead assembly, comprising:
   a wellhead housing having a bore, a tapered inner end surface, and a shoulder surface which is generally perpendicular to the bore;
   a wellhead connector having a bore, a tapered inner end surface, and a shoulder surface which is generally perpendicular to the bore, said wellhead connector being connected to the wellhead housing in end-to-end orientation; and
   a metal annular seal having a ring portion and a rib portion, the ring portion having an upper tapered sealing surface that sealingly engages the tapered inner end surface of the wellhead connector and a lower tapered sealing surface that sealingly engages the tapered inner end surface of the wellhead housing, and the rib portion having upper and lower legs extending generally radially outward from the rib portion relative to an axis of the wellhead housing and wellhead connector, each upper and lower leg having an upper surface and a lower surface, the upper leg having on its upper surface a foot portion which sealingly engages the shoulder surface of the wellhead connector, the lower leg having on its lower surface a foot portion which sealingly engages the shoulder surface of the wellhead housing.

8. The subsea wellhead assembly of claim 7 wherein the upper leg has on its upper surface a recessed portion located radially inward of the foot portion, and wherein the lower leg has on its lower surface a recessed portion located radially inward of the foot portion.

* * * * *